United States Patent [19]

Löfgren

[11] Patent Number: 5,225,454
[45] Date of Patent: Jul. 6, 1993

[54] RADAR CAMOUFLAGE MATERIAL
[75] Inventor: Per-ake Löfgren, Halmstad, Sweden
[73] Assignee: Barracuda Technologies, AB, Laholm, Sweden
[21] Appl. No.: 893,540
[22] Filed: Jun. 4, 1992

Related U.S. Application Data
[63] Continuation-in-part of Ser. No. 613,902, Jan. 31, 1991, abandoned.

[30] Foreign Application Priority Data

Apr. 19, 1989 [SE] Sweden .................................. 8901418

[51] Int. Cl.$^5$ ...................... C08F 114/06; H01B 1/04; C08K 3/04
[52] U.S. Cl. .................................... 521/145; 252/511; 521/902; 524/495; 524/496
[58] Field of Search ................. 252/511; 521/145, 921, 521/92; 524/495, 496, 897

[56] References Cited

U.S. PATENT DOCUMENTS 4,477,599 10/1984 Otsu et al. ........................... 521/145
5,102,922 4/1992 Kimura et al. ...................... 521/145

Primary Examiner—Paul R. Michl
Assistant Examiner—Peter Szekely
Attorney, Agent, or Firm—Lee, Mann, Smith, McWilliams, Sweeney & Ohlson

[57] ABSTRACT

In the manufacture of PVC cellular plastic, a liquid plastic mixture is admixed with fibres in an amount of at most 0.050 percent by weight fibres, preferably carbon fibres having a length of about 1 cm, which fibres are distributed in the expanded cellular plastic isotropically with respect to both position and alignment. The cellular plastic is effective to dampen electromagnetic radiation within the radar range to at least 1-3 dB per cm.

21 Claims, 6 Drawing Sheets

RADAR CAMOUFLAGE MATERIAL

RELATED APPLICATION

This application is a continuation-in-part of U.S. patent application Ser. No. 613,902, filed Jan. 31, 1991, and now abandoned.

The present invention relates to a method for the manufacture of radar camouflage material from a PVC cellular plastic having closed cells, and to a radar camouflage material of a corresponding kind.

Although PVC is not the most common of the foamed plastics materials available on the market, the manufacture of such material is nevertheless well known (see, for instance, Plastic Foams by Calvin J. Benning, Wiley 1964), which is distinguished by having good, well-defined mechanical strength properties and which is used, inter alia, as an intermediate layer in sandwich constructions. The lightness of the material in combination with its mechanical strength properties renders the material particularly useful. Its heat insulating properties are also an added benefit in many instances. Examples of such use are found in the manufacture of cisterns and in the installation of ship's plating.

The most common method applied at present for producing cellular PVC plastic is probably one in which a mixture which includes PVC together with an organic acid anhydride, isocynate and an expander is first treated in a flat container under pressure while raising the temperature, so as to form an embryo sheet, and then treated in water at a temperature in the proximity of 100° C. The expander then generates vapour bubbles and the material subsequently obtains the desired weight by volume, or density.

According to another method, practiced by the Swiss company Lonza, the expander is nitrogen gas supplied to the process in the form of a plastisol under pressure, where the various acrylates are able to cross-link. In this case, expansion takes place quite rapidly when the pressure is lowered during the process.

The object of the present invention is to provide a high-grade, closed-cell PVC cellular plastic which also exhibits an interaction effect with respect to radio radiation in radio wavelengths, suitable for camouflaging purposes.

This object is achieved in accordance with the invention by adding electrically conductive fibres to the aforesaid mixture in an amount of less than 0.050 percent by weight, said mixture then being allowed to expand and cross-link. The fibres will preferably have a length in the order of 8-15 mm. The fibres will preferably also have surfaces which afford adapted adhesion in relation to the expanding PVC-plastic, so that the fibres will have no appreciable effect on the expansion process. Furthermore, it is beneficial to ensure that the fibre distribution is isotropic, both with respect to quantity and direction. The tensile strength of the fibres will also be such as to obviate the risk of tensile fracture through adhesion to the expanding plastic.

It is well known to admix fibres with plastic material with the intention of improving mechanical strength (shear and tensile strength). This known admixture is counterproductive in this context, in that it is intended to create between fibres and matrix force-conducive or shape-conducive bonds, and the admixture of fibres in a foamed material would therefore counteract expansion. Experiments carried out in conjunction with the invention have confirmed this. It has been found, inter alia by experimentation, that some fibres used conventionally to reinforce plastic materials are unsuitable for the purpose of the invention. On the other hand, it has been found that in some instances fibres which have been surface treated to adhere to a plastic material other than PVC have shown little tendency to prevent expansion during foaming.

With regard to the mechanism of the camouflaging effect of such material, it is possible theoretically either to consider the absorption of radar waves, including scattering, or the impedance of the material. From a purely practical aspect, it is desirous to prevent radiation from an enemy radar transmitter being reflected in a manner which will enable the target to be detected. Effective reflection can be achieved when the target exhibits a large change in its dielectric constant, and consequently in the case of sandwich constructions an impedance-adapted material is preferred. This can be achieved in accordance with the invention, by adding to the aforesaid mixture a second conductive material in powder form, such as carbon powder, titanium powder and aluminum powder, in addition to electrically conductive fibres.

Polyurethane foam can be readily caused to expand in the presence of fibres, when foaming takes place in a wet environment, as distinct to the case of PVC-foam, which in the present case is expanded as a durable gel and not as a plastisol.

In the method of manufacturing PVC cellulose plastic employed by Diab-Barracuda, the mixture is relatively reactive during the gelation process. Consequently, conductive fibres of the aluminized glass-fibre type are not always effective. Such fibres may well be used in other manufacturing methods, as indicated by our experiments, which showed that the fibres functioned well in urethane foam, both with regard to foaming and radar properties.

Figure 1:
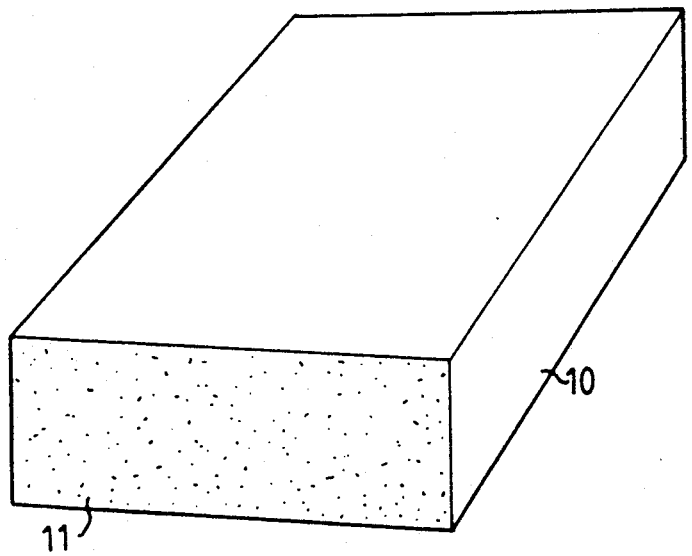
FIG. 1 illustrates an expanded plate or block having a cut surface.

When practicing the present invention, it is preferred, at present, to use a commercially available carbon fibre sold under the trade name HYFIL (diameter 0.3 micron, non-round) and another fibre sold under the tradename Thornel T-300 12 K (length 10 mm, diameter 7 microns). This latter fibre, with which the best results have been obtained, is a polyacrylnitrile-based fibre and is said by the manufacturer to be treated for improved adhesion, and therewith improved shear properties, but has been shown to have a relatively small expansion-inhibiting effect on our PVC-foaming process. A third fibre is TRACOR MBA, which is an aluminum-coated glass fibre.

The following compositions have been used in the experiments carried out:

| | |
|---|---|
| PVC | 52.33% |
| Phthalic acid enhydride | 17.45% |
| Azodicarbonamide | 0.75% |

| | |
|---|---|
| -continued | |
| Lead phosphite | 1.00% |
| α-phenylindole | 0.22% |
| Azodiisobutyronitrile | 0.75% |
| Toluendiisocyanate | 11.50% |
| Trichlorofluoromethane | 4.00% |
| Diphenylmethyldiisocyanate | 12.00 |

The last three components are liquids. Manufacture is effected by thoroughly mixing the dry components, adding the liquid components to the dry mixture and then mixing the components together to form a homogenous plastisol. The fibres are then added and the mixture is introduced into a flat mould, which is then covered with a lid or cover plate and placed in a press, in which the pressure is stepped up to 240 kg/Cm$^2$ and heated to 40° C. The temperature is increased incrementally to 175° C., which takes about 15 minutes, and is held constant for 35 minutes, and is then lowered to room temperature, which takes about a further 40 minutes. The resultant embryo is removed from the mould and then expanded, by immersing the embryo in water at 90° C., which is brought to a temperature immediately beneath boiling point, expansion taking place over a period of time sufficient to achieve the desired result, normally 3–4 hours. The material is subsequently cured in a water bath at 60° C. over several calendar days.

A number of tests have been carried out in accordance with examples, an account of which is given below. In those instances when satisfactory products were obtained, tests were carried out on the absorption of radar frequencies.

EXAMPLE 1

Fibres were clipped from aluminium foil which had been coated on one side with polyethylene and on the other side with polyester. Large bubbles were obtained in the expanded block, with a fibre in each bubble. The result was found to be totally unsatisfactory.

EXAMPLE 2

Fibres comprising very thin aluminium foil, similar to tinsel, were mixed with the plastic material. The fibres dissolved while forming bubbles.

EXAMPLE 3

A commericially available fibre (Tracor MBA) consisting of metallized glass fibre (aluminum) was tested in the same manner. The fibre resulted in the formation of bubbles and it was not possible to achieve sufficient expansion, not even when small quantities of fibre were admixed with the plastic material. Neither the mechanical properties of the material nor its ability to absorb radio waves (FIG. 4A) were satisfactory. A very good result was obtained, however, when this fibre was first dried at 100° C. at atmospheric pressure, or at 80° C. in a vacuum.

EXAMPLE 4

A fibre of pure aluminium (Transmet) was tested and gave visually satisfactory results, and also provided a material having good mechanical properties at low admixture contents. However, radar absorption of desired values could only be obtained when mixing large quantities of fibres with the plastic material such as to prevent the block from expanding sufficiently.

EXAMPLE 5

Aluminium fibres, so-called chaff consisting of metallized glass fibres had previously been tested in urethane foam with satisfactory results. When these fibres were admixed in accordance with the above recipe, satisfactory mechanical properties and non-inhibited expansion were achieved, although absorption in the radar frequency range was similar to the absorption obtained with PVC cellular plastic which contained no fibres. It is probable that the thin metal sheet became corroded or was destroyed mechanically.

EXAMPLE 6

In this example, there were used steel fibres, diameter 8 microns, obtained from the company Brunswick, U.S.A. The fibres were gathered into bundles, about 1,000 fibres in each bundle, and held together in polyvinyl alcohol. The bundles were released with water and dried. Expansion problems were experienced even when small quantities were admixed with the plastic material. Radio-wave absorption is low at such small quantities.

EXAMPLE 7

Steel fibre, of the steel-wool type, was used in this experiment. The fibre prevented expansion and the block formed was badly deformed. The absorption of radio waves was good.

EXAMPLE 8

Carbon fibre Carboflex which is a pitch based carbon fibre having a dimater of about 10 microns and a high spread in length, was used in this experiment. Acceptable expansion was obtained when admixing the fibres in an amount of 0.2% by volume, although radio-wave absorption was low.

EXAMPLE 9

Carbon fibres Thornel P-25 W 4 k having an average length of 10 mm were used in this experiment. This fibre is a pitch based carbon fibre, untreated, although of uniform length, and has a diameter of 11 microns. The radio-wave absorbency of the material was weak even at relatively high fibre-concentrations. Expansion is inhibited at very high fibre-concentrations, probably because the fibres are torn apart during the expansion process.

EXAMPLE 10

Figure 4A:
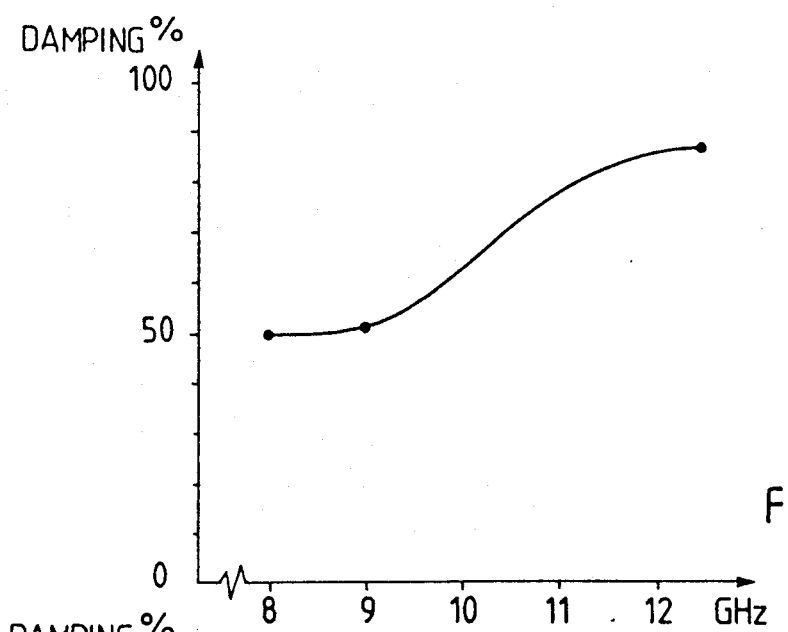
FIGS. 4A-4C illustrate additional absorption curves.
Figure 4B:
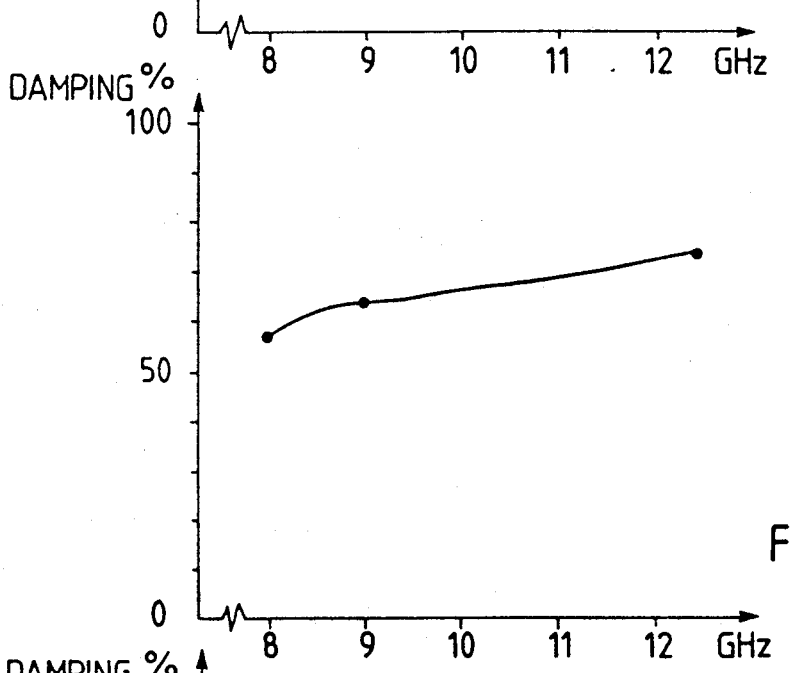

Carbon fibre Hyfil, length 12 mm, diamter 7.3 microns was used in this experiment. The fibre is a pitch based fibre. Good expansion was achieved, at least up to a density of 84 kg/m$^3$, implying a low fibre concentration which gave low radio-wave absorption. Better radio-wave absorption wa obtained at lower degrees of expansion 142 kg/m$^3$ (FIG. 4B).

EXAMPLE 11

The fibre used in this experiment was carbon fibre Thornel T-300 12 K, average length 10 mm. This fibre is based on polyacrylnitrile. It was difficult to achieve a high degree of expansion (60–80 kg/m$^2$). Satisfactory radar absorption was obtained at about 140 kg/m$^2$ and 0.02 percent by weight admixture (FIG. 4C and FIGS. 5A–D respectively).

EXAMPLE 12

An impedance-adapted material was manufactured with an addition of 0.5% titanium powder, 0.1% aluminium powder, 0.02% carbon powder and 0.5% Bechinox steel fibres, 6 mm long. Good results were achieved with steel fibres 4 micron in diameter and also with steel fibres 8 micron in diameter. Plates manufactured to a thickness of 60 mm were found to provide a damping of 5 dB both within the X-band (8.12 GHz) and the KA-band (12–18 GHz).

Figure 2:
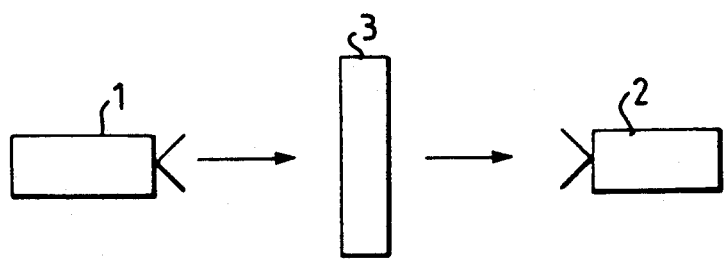
FIG. 2 illustrates an experiment in radio wave absorption.

FIG. 1 illustrates a representative example of an expanded plate or block 10 having a cut surface 11. The randomly distributed fibres project from the surface 11. FIG. 2 illustrates schematically an experiment in radio wave absorption. This experiment was carried out by passing waves of radio frequency from a transmitter 1 through a receiver 2. A PVC cellular-plastic plate incorporating fibres was placed between the transmitter and the receiver. The extent to which the waves were absorbed was determined by measuring absorption with the plate 2 in position and with the plate removed.

Figure 3:
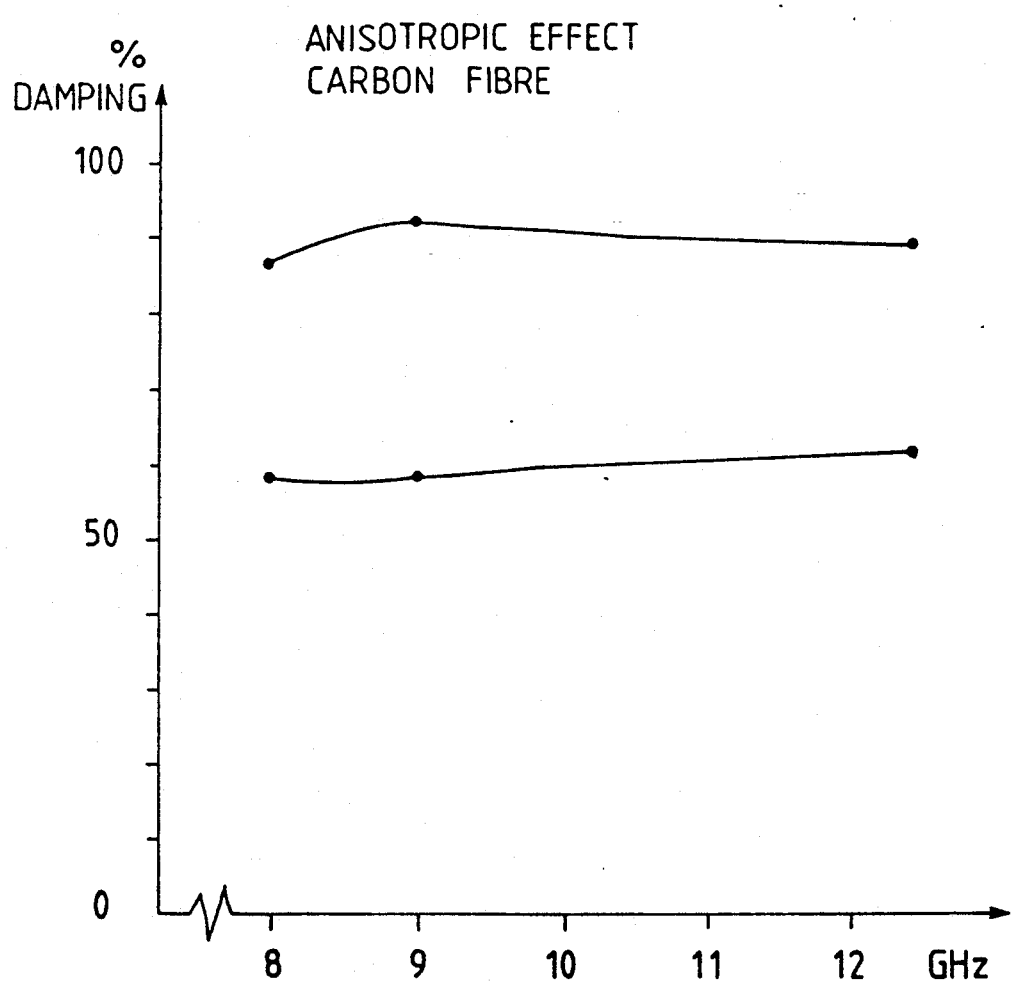
FIG. 3 illustrates two absorption curves.

Reference made to absorption in percent in this description refers to the measured amount of energy received with and without the plate. This is clearly not in agreement with a conventional method of expressing absorption, since by absorption is normally meant that the radiation has been lost completely in heat, etc. In this case, however, all losses, including scattering losses, are placed on an equal level with one another. When the fibres randomly disposed in the plate are subjected to the wave field, the fibres will function as small antennas, essentially dipoles (if the coherence phenomenon is ignored), and the radiation will be scattered in all directions. Part of the detected radiation can thus be considered as being scattered, and in fact scattered several times. An example of this is illustrated in FIG. 3, which shows two absorption curves obtained with one and the same plate 3 (containing carbon fibres), said plate being rotated through 90° between the separate occasions of recording the curves. As will be seen from FIG. 3, absorption within the range of 8–13 GHz is about 60% for one position of rotation, but about 90% for the other position of rotation. This is because the waves transmitted by the transmitter are strongly polarized, and also because orientation of the fibres is not sufficiently random, but exhibits a preferred direction coinciding with the polarization direction of the transmitter 2 in the first case and coinciding with the normal direction of the transmitter in the other case.

This shows the need to randomize orientation of the fibres during manufacture. This applies particularly when pouring the plastisol into the mould, since the fibres tend to align themselves with the flow direction, when the plastisol is simply poured into said mould. One method of preventing this is to introduce the plastisol into the mould through a nozzle provided with chicanes, obstacles, which cause the flows to cross. Another method is to fill the mould in a manner to avoid the plastisol running in the transverse direction of the mould. With respect to the use of the material for camouflaging purposes, the radar used by an observer does not have a high resolution, and average randomization of the fibres over large surface areas will suffice in general.

Figure 6:
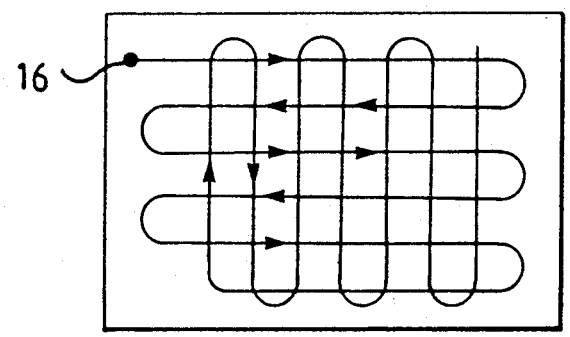
FIG. 6 illustrates a method of obtaining good directional distribution in a mould.

One particularly advantageous method of obtaining good directional distribution is to fill the mould with the plastisol in the form of a relatively narrow stream which is allowed to fall onto the flat mould in a meandering fashion, as illustrated in FIG. 6, with the stream of material first falling at point 16 and then meandering, row for row, whereafter a new layer is laid perpendicularly to the first layer in a new row direction, etc. Diagonal layers can also be laid. Although this can be effected manually, it is preferred to use an appropriately programmed industrial robot.

Hitherto, the inventive product has been discussed with respect to absorption in relation to electromagnetic radiation of radar wavelengths. This is conducive with the natural method of taking measurements, namely insertion of the material in the path of a beam between a transmitter and a receiver. This absorption can be expressed in linear measurements in percent, but is often expressed in the logarithmic measurement for damping, dB (decibel).

It should be observed that absorption, as referred to in the present description and claims, does not conform with the strictly physical term absorption, which implies conversion of the electromagnetic radiation to heat, as a rule. Instead, the word absorption, as used in the present specification, refers to the relationship between the intensity detected with the presence of an absorber and the intensity detected in the absence of an absorber. Consequently, radiation which is scattered and therewith lost is also calculated among the losses obtained. This definition is, in fact, extremely appropriate in the present context, since the product concerned is intended for camouflaging purposes. The purpose of the product is to conceal an object which has a recognizable structure or which is highly reflective. The most difficult objects to conceal are, for instance, objects which present a concave corner defined by three, mutually perpendicular metal surfaces, which result in pronounced back-reflection within a wide angular range. When this object is screened with the aid of material according to the invention, a detecting radar beam must first pass through the material, be reflected by the object and again pass through the material on its return, before it arrives back at the transmitter and can be detected. In this context, the losses occurring as a result of scattering will have essentially the same utility as losses occurring by conversion to heat.

Figure 4C:
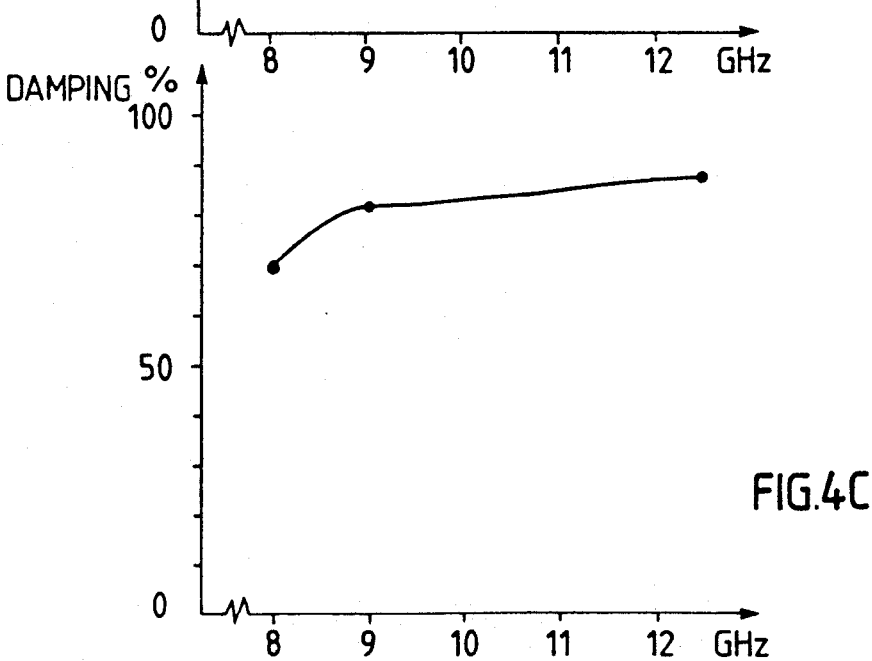
Figure 5A:
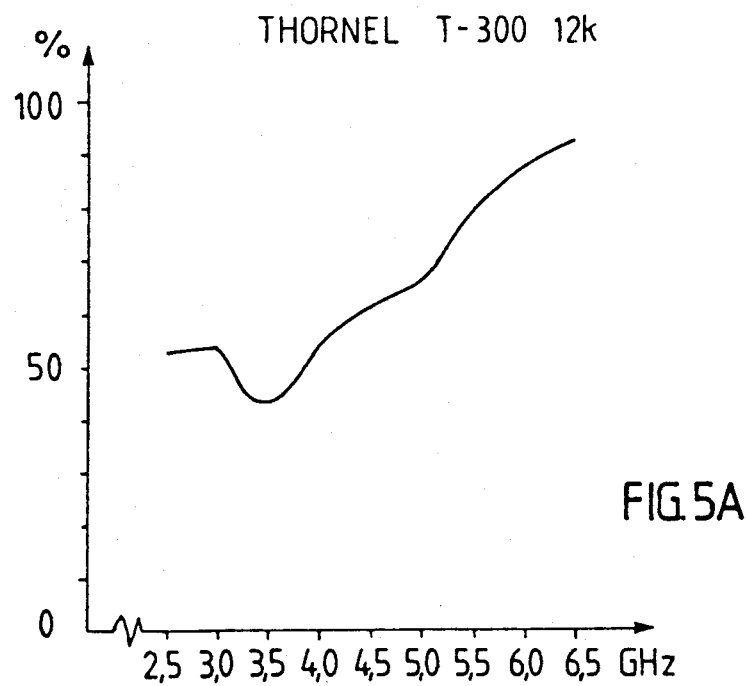
FIGS. 5A-5D illustrate additional absorption curves.
Figure 5B:
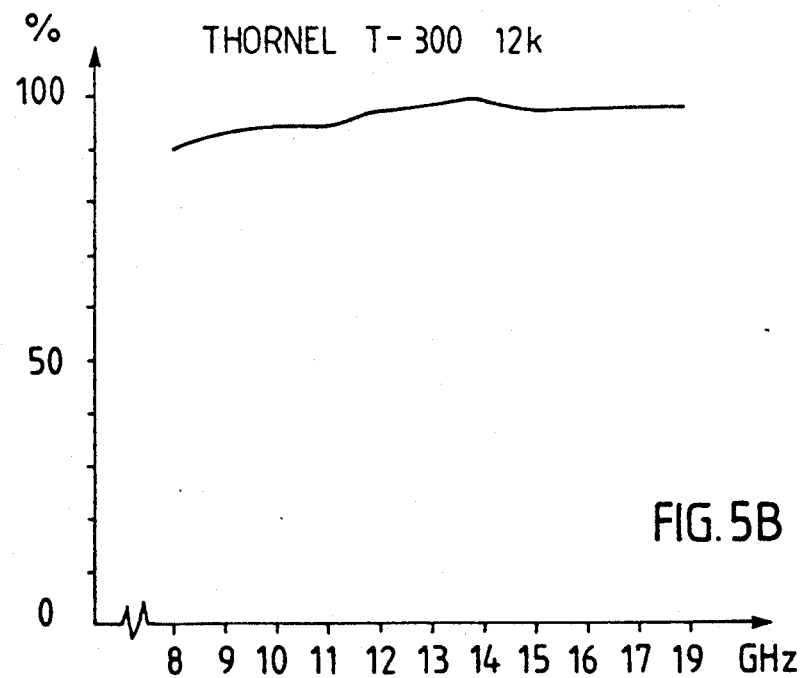
Figure 5C:
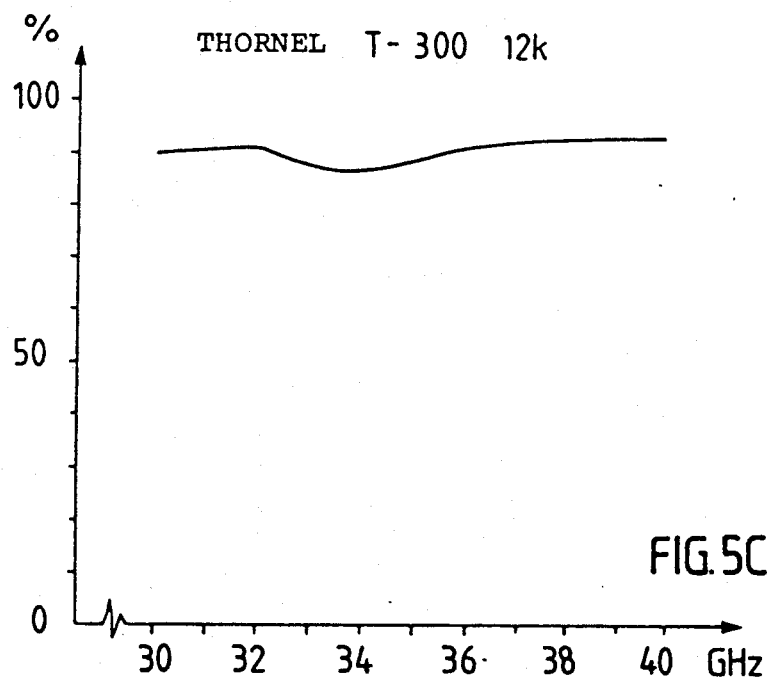
Figure 5D:
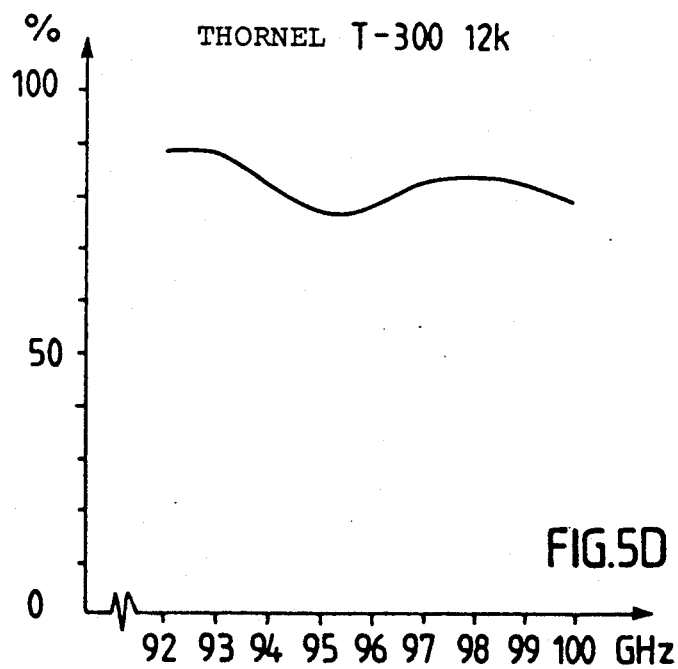

The damping curves illustrated in the Figures are obtained with plates having a size or 300×300×30 mm. A close study of the damping curves will show the following. FIGS. 4A–4C are representative of the range 8–12 GHz, corresponding to wavelengths of 3.75–2.5 cm. It will be seen that damping is better for short wavelengths (high frequencies) than for long wavelengths (lower frequencies). Although several mechanisms conceivably contribute to this phenomenon, it is assumed that the effect achieved in FIG. 4A is because the length of the fibres in the finished material is, on average, smaller than the length of the fibre, about 10 mm, when it was admixed with the plastic material. The curves shown in FIGS. 5A–5D are representative of measurements made with one and the same material (fibre Thornel T-200 12k) over several frequency ranges. The curves show a strong reduction in absorption between 2.5–6.5 GHz (12–4.6 cm). This can be due to the fact that, inter alia, the wavelength is greater than four times the lengths of the fibres.

In the aforegoing, an embodiment of the invention at present preferred has been described, according to which a PVC plastisol containing an expander is admixed with fibres and the mixture treated under pressure and high temperature to form a blank or embryo, which is then permitted to expand in water at a temperature closer to boiling point. The invention can also be applied in other methods for the manufacture of PVC cellular plastic having closed cells, for instance the method mentioned briefly in the aforegoing in which nitrogen gas (or some other not-readily condensed gas) is supplied under pressure in a treatment process at high pressure and high temperature, therewith to provide a matrix which is expanded by lowering the pressure. In this case, the fibres are added prior to applying pressure.

When practicing the invention, it is important that electrically conductive fibres are distributed randomly to the greatest extent possible, such as to obtain a good and suitable radar masking effect in constructions based on PVC cellular plastic. The measurable mechanical properties of the cellular plastic are changed only very slightly in relation to an expanded PVC cellular plastic which does not contain fibres and which is manufactured in a similar manner. It has thus been possible to establish that the difference is scarcely measurable, by testing the material with regard to its shear strength, tensile strength and compression strength.

As development of the invention has progressed, it has been determined that a concentration of the fibres need be relatively low. Further development has determined a typical concentration of the fibres being 0.022 percent by weight. Substantially higher concentrations give too much reflectivity of radar, not the result intended. Concentrations below 0.050 percent by weight give good results. Another concentration attempted has been 0.033 percent by weight, resulting also in good results.

Different fibre lengths provide damping at different wavelengths. Utilization of a mix of three fibre lengths, about 6, 9 and 12 mm, results in maximum efficiency at about 6, 7.8 and 11.5 GHz, respectively. Such a material is particularly useful in mine-sweeping ships.

I claim:

1. A method of manufacturing camouflage material comprising PVC cellular plastic having closed cells, the method comprising the steps of preparing a mixture of PVC and an expander, introducing the mixture into a flat container, heating the container under pressure to gelation and cell nucleation, and causing the mixture to expand under atmospheric pressure through the action of the expander, to form a closed-cell cellular plastic, and including adding electrically conductive fibres in the step of the preparation of the mixture, in an amount beneath 0.050 percent by weight of the mixture such that when irradiated with radio radiation frequencies of 3-100 GHz, the material exhibits an absorption, calculated on direct transmission, of at least 1-3 dB per centimeter of thickness.

2. A method according to claim 1, in which the mixture includes an organic acid anhydride and isocynate, in which the expander is a fluorohydrocarbon, and in which expansion is effected by treating the material plate removed from the flat container with water or water vapor steam at a temperature of at least about 100° C.

3. A method according to claim 1, in which the flat container is filled by successively introducing the mixture in the form of a narrow stream the impact point of which in the container is caused to wander systematically over the plane of said container.

4. A method according to claim 1, in which the expander comprises a gas, preferably nitrogen, which is supplied to the pressurized flat container, expansion occurring when the pressure is lowered.

5. A method according to claim 1, in which the fibres have a length in the order of 6-15 mm.

6. A method according to claim 1, in which the fibres present surfaces of moderate adhesion in relation to the expanding cellular plastic, so that expansion of the plastic will not be substantially inhibited by the fibres.

7. A method according to claim 1, in which the PVC cellular plastic is expanded to a density of 50-400 kg/m$^3$.

8. A method according to claim 1, in which the fibres used are carbon based fibres.

9. A method according to claim 8, in which the carbon-based fibres have not been surface treated.

10. A camouflage material comprising a PVC cellular plastic with closed cells, in which the material includes electrically conductive fibres which are distributed essentially isotropically with respect to direction and distribution in a concentration below 0.05% by weight, and said material when irradiated with radio radiation at frequencies of 3-100 GHz exhibits an absorption, calculated on direct transmission, of at least 1 dB to at least 3 dB per centimeter of thickness.

11. A material according to claim 10, in which said material has a density of 50-400 kg/m$^3$.

12. A material according to claim 10, in which the fibre ends exposed when cutting a section through said material will not be extendable to any substantial degree without breaking.

13. A material according to claim 10, in which the fibres are carbon-based fibres.

14. A material according to claim 13, in which the carbon fibres are not surface treated.

15. A material according to claim 10, in which the material exhibits essentially the same shear modulus, shear strength and diagonal tension strength as a similar material which contains no fibres.

16. A material according to claim 10, in which the material includes 0.020-0.050% carbon fibres.

17. A material according to claim 10 in which the conductive fibres are about 0.022% by weight.

18. A material according to claim 10 in which the conductive fibres have a length of from about 6 to 12 mm.

19. A material according to claim 10 in which the fibres are about 6 mm long.

20. A material according to claim 10 in which the fibres are about 9 mm long.

21. A material according to claim 10 in which the fibres are about 12 mm long.

* * * * *